April 16, 1929.  P. NELSON  1,709,364
DUMPING VEHICLE
Filed Sept. 15, 1924   2 Sheets-Sheet 1

Inventor
Pear Nelson
By F. E. Shannon
Attorney

April 16, 1929.  P. NELSON  1,709,364
DUMPING VEHICLE
Filed Sept. 15, 1924   2 Sheets-Sheet 2
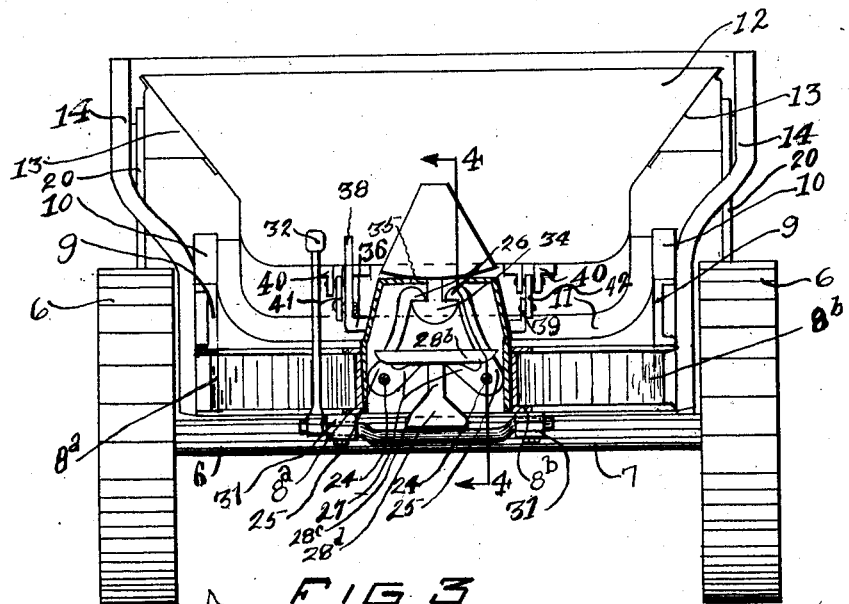
FIG 3
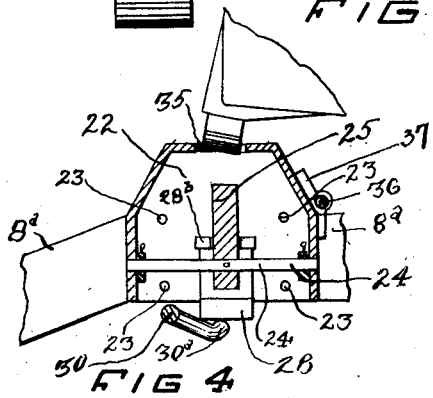
FIG 4
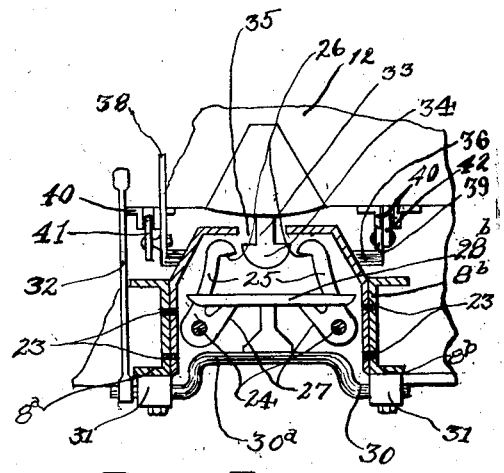
FIG 5
FIG 6
Inventor
Pear Nelson
By F. E. Shannon
Attorney Patented Apr. 16, 1929.

1,709,364

UNITED STATES PATENT OFFICE.

PEAR NELSON, OF AKRON, OHIO.

DUMPING VEHICLE.

Application filed September 15, 1924. Serial No. 737,667.

This invention relates to dumping vehicles and while applicable to any form of vehicle having a dumping box, it is particularly adapted for use in connection with a trailer.

Objects of the invention are to provide a vehicle having a dumping box of strong, durable construction and to provide in connection therewith, simple, conveniently operable means for moving the box to and from a dumping position.

A further object is to provide a new and novel construction wherein the box may be securely held in a hauling position and to provide a new and improved means for releasing the securing means whereby the box will be brought into a dumping position by the weight of the load and to provide means for locking the box in a dumping position and conveniently operable means for releasing the locking means whereby the box will be retained in a hauling position by the force of its own weight.

An additional object is to provide a vehicle of the class above referred to having a new and improved end gate and to provide novel means for automatically operating the end gate whereby the same may be loosened from the load and held in a position where it will not interfere with the dumping operation.

The above and additional objects are accomplished by the novel construction, combination and arrangement of parts hereinafter described and illustrated in the accompanying drawings, wherein I have shown a preferred embodiment of the invention, it being understood that the invention is capable of various adaptations and that changes and modifications may be made or substitutions resorted to which come within the scope of the claim hereunto appended.

In the drawings in which similar numerals of reference are used to denote like or similar parts as the same may appear in any of the several views and in which:—

Figure 3 is a cross sectional view taken as indicated by the lines 3—3 of Figure 1 and illustrating particularly the means employed to hold the vehicle in a hauling position and also illustrating the mechanism employed to release the box from its hauling position.

Figure 4 is a longitudinal, sectional view taken as indicated by the lines 4—4 of Figure 3.

Figure 5 is a cross sectional view taken approximately on the line 3—3 of Figure 1.

Figure 6 is a perspective view of the weight employed in carrying out this invention.

Figure 1:
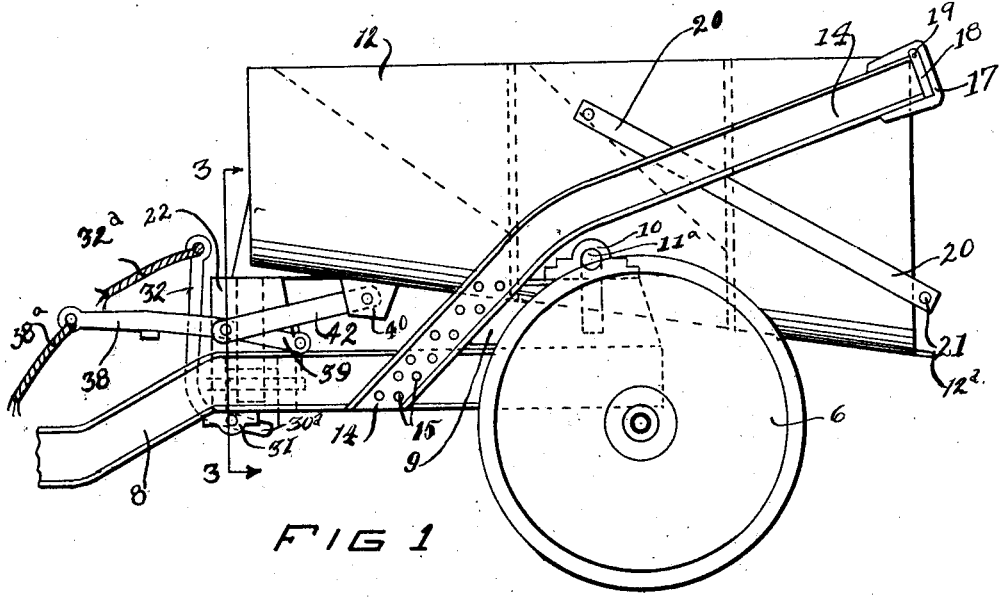
Figure 1 is a side elevational view of a trailer constructed in accordance with this invention showing the same with the box in a hauling position, the forward portion of the trailer frame being broken away.

Proceeding now to a detailed description of the invention with reference to the particular adaptation thereof illustrated in the drawings, the numeral 6 is used to denote the vehicle wheels which may be of any desired construction. The numeral 7 denotes the vehicle axle on which is suitably secured the trailer frame 8. The frame 8 includes two side members $8^a$ and $8^b$ which extend in parallel spaced relation and which converge to form the forward end of the frame. Each of the members $8^a$ and $8^b$ are preferably arranged with their flanged side presented outwardly. The numeral 9 denotes a channel member which is also arranged with its flanged side positioned outwardly and one of which is suitably secured on each of the frame members $8^a$ and $8^b$ to form a support for the box axle bearings 10.

The box axle 11 is substantially U-shaped being provided with up-turned end portions which terminate in the cylindrical portions $11^a$ which are journaled in the bearings 10, thus providing a box support, the central portion of which is disposed below the axis on which it is mounted.

The numeral 12 is used generally to denote a box which is suitably secured to the axle 11. The floor of the box has a cross sectional shape adapted to be received within the U-shaped portion of the axle 11 and the floor is inclined downwardly toward the rear end of the box. The box is relatively narrow along the bottom thereof and is provided with an outwardly flared side wall 13. The box is secured to the frame so that the portion extending forwardly from the axle members $11^a$ is of greater weight than the portion of the box extending rearwardly therefrom, thereby providing a box, which when empty will return by the force of gravity to the hauling position shown in Figure 1, inasmuch as the box is of greater depth at the rear end thereof, the same when loaded will carry a greater amount of the load rearwardly from the axle whereby the box when loaded will be moved by the force of gravity to the position shown in Figure 2.

The numeral 14 is used to denote channel members, one of which is secured to each side of the frame by means of the bolts 15 or other suitable fastening means. The members 14 are inclined upwardly and rearwardly and extend in parallel relation along the side of the box, each terminating at a point adjacent each upper end of the end gate 16. Each member 14 is provided at the rear end thereof with an end portion 17 and with a slot 18 which is inclined downwardly and rearwardly from a point at or adjacent the upper rear corner of each side member 14. The end gate 16 is provided on the upper side of each end thereof with an outwardly projecting pin 19 which is mounted in one of the slots 18. The numeral 20 denotes arms which are pivotally secured to the box 12 at points upwardly from and in spaced relation to the upper end 11$^a$ of the axle 11. The members 20 extend rearwardly and downwardly and each is pivotally secured to the end gate 16 at a point adjacent the lower edge thereof by means of the bolt 21 or other suitable means.

The means employed to secure the box 12 in a hauling position comprises a hollow casing 22 which is suitably secured between the frame members 8$^a$ and 8$^b$ at a point directly beneath the forward end of the box. The casing 22 is substantially rectangular in cross sectional area and is securely held in place between the frame members 8$^a$ and 8$^b$ by means of the rivets 23 or other suitable fastening means. The numeral 24 denotes parallel shafts which are positioned longitudinally of the vehicle and extend across the casing 22, each end of each shaft being journaled in the wall of said casing. Each shaft 24 is provided centrally thereof with a dog 25 which are shown in a locking position in Figure 3 and in an open position in Figure 5. Each dog extends upwardly from the shaft 24 and is provided on the upwardly projecting end thereof with an inwardly projecting lug 26. Each of the dogs 25 are provided at the lower end thereof with an upwardly inclined, inwardly projecting portion 27. The numeral 28 denotes a weight which has an enlarged base 28$^a$ and a relatively flat enlarged head 28$^b$ and a relatively thin neck portion 28$^c$. The neck portion 28$^c$ is adapted to be positioned between the upwardly projecting portions 27 with the flat head 28$^b$ resting thereon. The head portion is provided on each lateral side thereof with a notch 29 which is adapted to receive the dogs 25. The numeral 30 denotes a crank shaft which extends transversely of the casing 22 and is journaled in the bearings 31 which are suitably secured to the bottom of the frame members 8$^a$ and 8$^b$. The central portion of the crank 30 is bent outwardly from the axis thereof to form a central portion 30$^a$. The numeral 32 denotes a lever which is secured to one end of the crank shaft 30 whereby the lever may be operated to impart a rotary movement to the crank shaft 30 thereby raising and lowering the weight 28. In a locked position, the crank shaft is positioned as shown in Figure 4 and in an unlocked position the central portion 30$^a$ is raised as shown in Figure 5. In a locked position the dogs 25 are inclined inwardly as shown in Figure 3 and it will be seen that an upward movement of the weight 28 will cause a spreading movement of said dogs. The weight 28 being supported by the portion 30$^a$ of the crank 30 is sufficient to bring the crank 30 to the position shown in Figure 4 when the trip lever 32 is rocked. As the head 28$^b$ is positioned on the inwardly projecting portions 27, a downward movement of the weight 28 will simultaneously bring the dogs inwardly to the position shown in Figure 3. The box 12 is provided at the forward end thereof with a downwardly projecting lug 33 which is provided with a laterally projecting head 34.

The casing 22 is provided in the upper wall thereof with an opening 35 which is adapted to permit the entrance of the lug 33 which is adapted to be entered into said opening and be received between the dogs 25 whereby the lugs 26 will engage said head and hold the same in a locked position.

The numeral 36 denotes a horizontal shaft which is journaled in suitable bearings 37 secured to the rear face of the casing 22. The shaft 36 is disposed in a plane positioned above the top of the frame members 8$^a$ and 8$^b$ and projects from each lateral side of the casing 22. The shaft 36 is provided on one end thereof with an operating lever 38 and on the other end thereof with a relatively shorter arm 39. The box 12 is provided at a point adjacent the forward end thereof with a downwardly projecting ear 40 in which is pivotally secured a strap 41, the other end of said strap being pivotally secured to the lever 38 at a point intermediate its length. A like strap 42 is pivotally secured to the ears 40 and pivotally secured to the arm 39. The lever 38 is preferably formed with a slight angle at the point where it is pivotally secured to the strap member 41. The numeral 43 denotes a stop which projects from said arm thereby providing means whereby the straps 41 and 42 will swing past the center of the lever and provide means whereby the box 12 may be held in a locked position.

A rope 32$^a$ is connected to the end of the lever 32 and a rope 38$^a$ is connected to the lever 38, the said ropes leading to the driver's seat whereby the levers 38 and 32 may be operated from that position.

Figure 2:
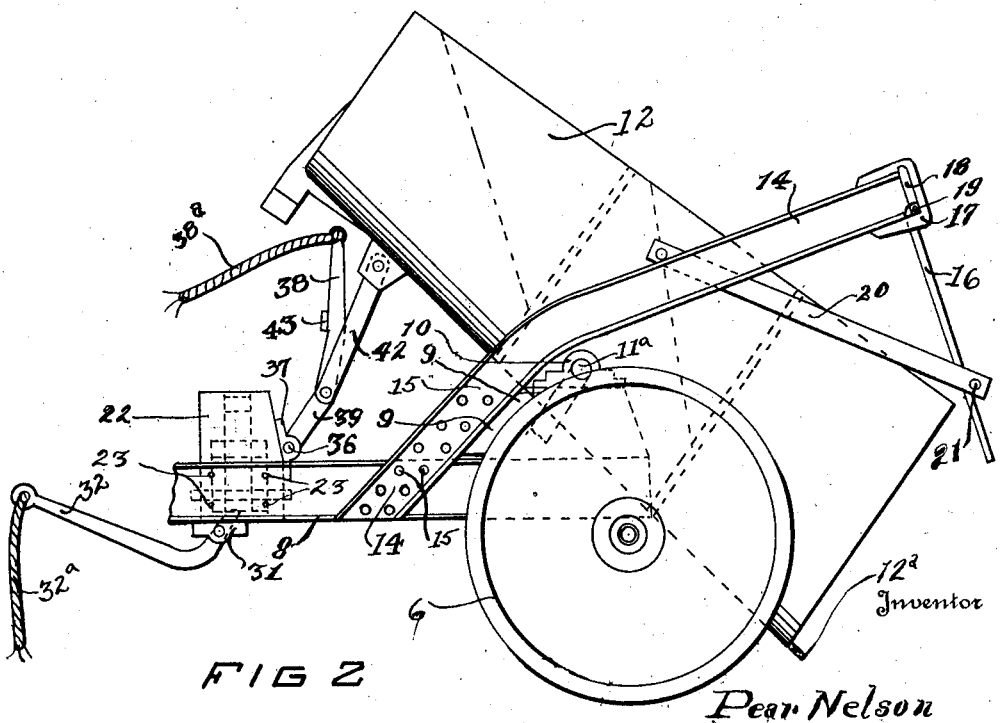
Figure 2 is a similar elevational view showing the box in a dumping position.

In use, the box is placed in the position shown in Figure 1. In this position the end gate 16 is tightly closed and the lug 34 is engaged by the dogs 25 thus securely holding the box in a hauling position. It will be noted that the box 12 is relatively deeper at the rear end thereof and that a relatively greater amount of load is positioned rearwardly from the axle 11ª. When the operator desires to unload the box 12, a pull is exerted on the rope 32ª, thus raising the weight 28. The upward movement of the weight moves the dogs 25 outwardly and releases the lugs 33. The greater amount of the load being disposed rearwardly from the axle 11ª, the box will tip rearwardly. The upper end of the end gate 16 being secured to the arms 15, the swinging movement of the box will operate the arms 20 causing the lower end of the end gate to move outwardly releasing it from the load. As the box moves downwardly the levers 20 move the end gate rearwardly out of the path of the box 12. The outwardly projecting pins 19 will move downwardly into the slots 18 to the position shown in Figure 2. The bottom of the box 12 projects rearwardly to form the projecting portion 12ª. As the box 12 moves upwardly the projecting portion contacts with the bottom of the end gate 16 and forces it upwardly in the inclined slots 18 and thus forcing the end gate firmly in place. As the box 12 moves into a dumping position, the lever 38 and the arm 39 are carried rearwardly until the straps 41 and 42 are positioned over the center of said lever and said arm, thereby locking the box in a dumping position. When the box is empty, the operator exerts a pull on the rope 38ª, thus releasing the box and permitting it to return, by the force of gravity, to a hauling position.

It will thus be seen that this invention provides a new and improved vehicle which is particularly adapted to be used as a trailer and which may be conveniently operated from a driver's seat positioned forwardly from said vehicle.

Having thus illustrated my invention and described the same in detail, what I claim as new and desire to secure by Letters Patent is:—

In a vehicle of the class described, a vehicle axle, a frame mounted thereon, a box, means to rotatably secure said box to said frame for turning movement on an axis extending in parallel relation to said axle; means associated with said frame, to releasably hold the box in a horizontal position, a beam projecting upwardly and rearwardly from each side of said frame, each beam terminating adjacent an upper rear corner of said box, each of said beams provided with an inclined slot in the rear end thereof; an end gate for said box, said end gate having pins slidably mounted in said slots; an arm pivotally secured to each side of said box at a point spaced upwardly from said axis; means to pivotally secure the other end of each of said arms to said end gate.

In testimony whereof I have hereunto set my hand.

PEAR NELSON.